(No Model.) 2 Sheets—Sheet 1.
E. THOMSON.
METHOD OF REGULATING CURRENT OR POTENTIAL IN SECONDARY OF TRANSFORMERS.
No. 400,516. Patented Apr. 2, 1889.
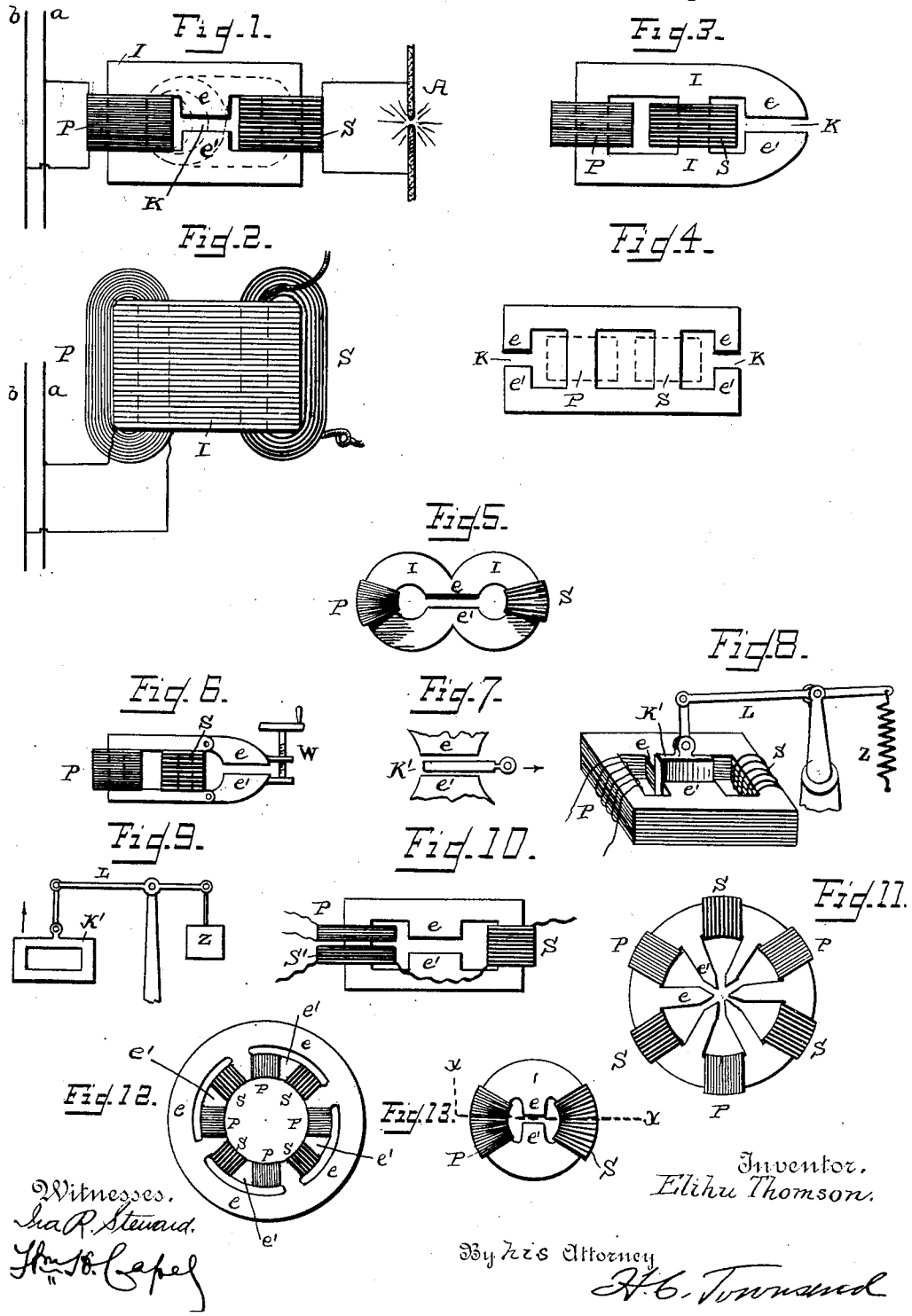
Witnesses.
Ira R. Steward.
Thos. S. Capel
Inventor.
Elihu Thomson.
By his Attorney
H. C. Townsend (No Model.)  2 Sheets—Sheet 2.
E. THOMSON.
METHOD OF REGULATING CURRENT OR POTENTIAL IN SECONDARY OF TRANSFORMERS.
No. 400,516. Patented Apr. 2, 1889.
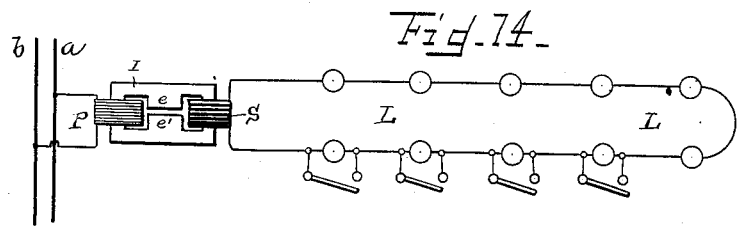
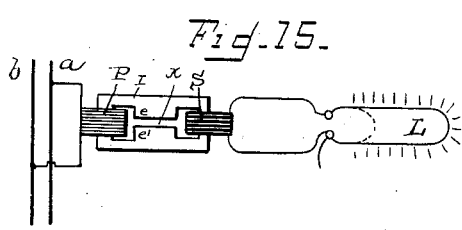
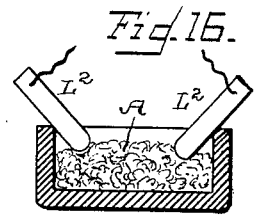
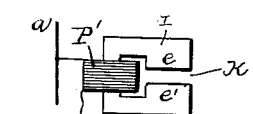
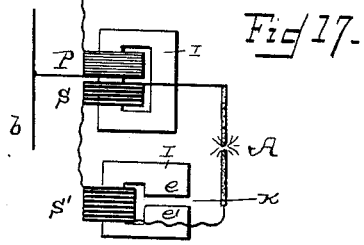
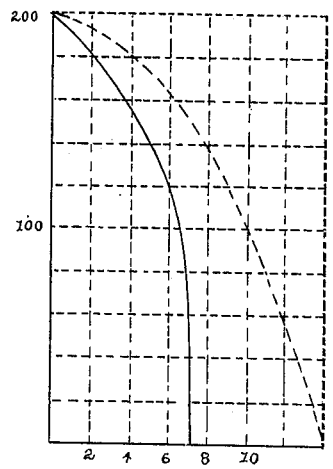
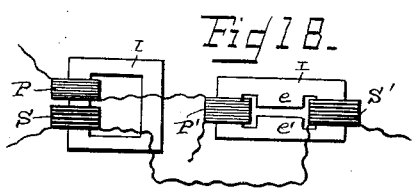
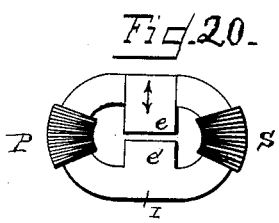
Witnesses,
Ira R. Steward
Wm. H. Capel
Inventor,
Elihu Thomson,
By his Attorney
H. C. Townsend

UNITED STATES PATENT OFFICE.

ELIHU THOMSON, OF LYNN, MASSACHUSETTS.

METHOD OF REGULATING CURRENT OR POTENTIAL IN SECONDARY OF TRANSFORMERS.

SPECIFICATION forming part of Letters Patent No. 400,516, dated April 2, 1889.

Application filed January 10, 1889. Serial No. 296,019. (No model.)

*To all whom it may concern:*

Be it known that I, ELIHU THOMSON, a citizen of the United States, and a resident of Lynn, in the county of Essex and State of Massachusetts, have invented a certain new and useful Method of Regulating Current or Potential in Secondary of Transformers, of which the following is a specification.

My invention relates to electrical apparatus in which two coils or circuits are placed in inductive relation to one another, one of such coils or circuits being traversed by alternating or otherwise varying currents from any desired source.

The object of my invention is to regulate or adjust the current made to flow in the second of the two coils by the alternating currents in the first.

The invention is especially applicable to that class of apparatus known as "induction-coils" or "transformers," and can be used for obtaining a current from the secondary which shall differ radically in properties or character from that from which the primary draws its supply. Thus, if the primary coil of a converter be attached to a constant-potential circuit as a branch, the current which I am enabled to obtain in the secondary circuit may, instead of being approximately of constant potential like the primary, be of approximately constant strength or volume of flow, regardless of a wide range of differences of resistance interposed in such secondary circuit; or, again, I may obtain from the secondary an electro-motive force or potential which diminishes as the current strength increases, as when resistance is gradually taken out of the secondary circuit.

My invention is particularly applicable to the running of arc lamps by induction from constant-potential mains without the use of resistances in circuit with the arcs for limiting the current which they receive, since by the use of my invention any increase in the secondary may be made to produce a fall of electro-motive force given out by the secondary coil feeding the arc. Were this not the case, or were the electro-motive force maintained, the current flowing to the arc lamps would be unstable, and the lamps would be very irregular in action, owing to the fact that as the current in the arc increases the resistance of the arc falls, which would, with constant potential, bring about further current increase, and so on.

In my invention, if the current is to be ten ampères for the arcs, it cannot rise much above that amount, no matter whether the carbons in the arc are apart or near together, or in actual contact. I am enabled, also, in my invention to operate a number of incandescent lamps or other translating devices in series from the secondary coil of a transformer, and permit the shunting without resistance of one or more of the lamps, while the current in the circuit of the remainder is substantially unchanged. In fact, by proper modifications in the manner of carrying out my invention, the primary coil being on constant potential, the secondary coil may be short-circuited and retain only the normal or a slightly-increased current. I am not aware that this has ever been done before.

My invention consists, essentially, in a novel method of adjusting, regulating, or determining the current or potential in the secondary of two coils or circuits placed in inductive relation by developing alternating magnetism through the action of the current in each or either of said circuits in a suitable iron core, and variably closing the magnetic circuit of said core through a path independent, in whole or in part, of the magnetic circuit for the magnetism developed by the other coil or circuit.

The variable closure of the magnetic circuit may be produced by any desired means, but is preferably automatic, and is produced by the direct action of the lines of magnetic force themselves in concentrating or focusing themselves in or across a narrow non-magnetic space or septum, forming a partial break in what would otherwise be a perfectly-closed magnetic circuit or path for the magnetism developed by the current of the coil or circuit in question. The variable closure may, however, be produced in other ways without departing from my invention, as will presently appear. The magnetic circuit for magnetism so developed by one of said coils or circuits may be that either of the primary or the secondary, or, as will be evident, the magnetic circuits developed by the current flowing through both coils or circuits may be partially and variably closed at once. In any case, however, there should be an opportunity for a magnetic circuit for each coil or circuit which shall be independent, in whole or in part, of that developed by the other—that is to say, each magnetic circuit may have a path entirely independent at all points of that for the other, or each may include a part of the path of the other, such common part being in ordinary cases the part where the higher magnetic resistance resides and where the variations in the magnetic closure are produced.

In the accompanying drawings, Figure 1 is a diagram illustrating circuits and apparatus by which my invention may be carried out. Fig. 2 is a plan view of the apparatus shown in Fig. 1. Figs. 3, 4, and 5 show another form of induction-coil that may be used. Fig. 6 illustrates a modification in the devices for carrying out the invention. Figs. 7 and 8 show in partial side view and in perspective other devices that may be employed. Fig. 9 shows in perspective a part of a similar device. Figs. 10, 11, 12, and 13 illustrate other modifications in the form of devices and in the manner of applying the invention. Figs. 14, 15, and 16 illustrate some of the uses of my invention. Fig. 17 is a diagram illustrating the elementary principle of my invention. Fig. 18 shows a further modification in the manner of applying my invention. Fig. 19 is a diagram of current and potential. Fig. 20 illustrates a device that may be employed for producing variations in the closure of the magnetic circuit or for adjusting the action of the apparatus.

In the various figures of the drawings, $a$ and $b$ indicate alternating-current mains having a constant or approximately constant difference of potential, and P a coil in the circuit between said mains.

S is a coil of suitable number of turns, according to the potential to be derived therefrom, in inductive relation to the coil or circuit between $a$ $b$, which coil S forms a part of and supplies to a local circuit currents inductively set up by the currents in the circuit from $a$ to $b$. The coils P and S are preferably wound on the same continuous or endless laminated or other core, I, and the number of turns in P, or in any coil in circuit with it, as P', is such that, having reference to the potential of $a$ $b$, very little current will pass in P when the circuit of S is open.

Referring first to Fig. 17, P' indicates an additional coil wound on a suitable iron core, I, laminated or otherwise, and in which core the currents flowing from $a$ to $b$ as an alternating or otherwise varying current will obviously produce an alternating magnetism, and if the core of said coil were continued around so as to be endless, there would be a magnetic circuit entirely closed and a maximum of reactive effect in the coil P' opposing the passage of current from $a$ to $b$. Instead, however, of making the magnetic circuit completely closed, I provide the core I with projections $e$ $e'$, which are brought rather closely together, with, however, a determinate air-space between them, forming a partial break in the closure of the magnetic circuit for the magnetism developed by the current flowing from $a$ to $b$. The width of the space may be in some cases quite narrow, and in others the projections $e$ $e'$ may be well separated. The space forms an air or magnetic resistance to the closure of the magnetic circuit for coils P', and, as will be obvious, the more perfect the closure of the magnetic circuit at this variable point the greater will be the reaction upon the currents flowing from $a$ to $b$ through coils P'. During normal flow of currents from $a$ to $b$ there is a definite degree of closure of the magnetic circuit at K, dependent upon the width of the space and the number of magnetic lines of force which, with the given strength of magnetism in the core of P, may force themselves across the space. If there is any tendency to increase in the magnetism of the core of P', the lines of force concentrate or mass themselves together in the space across K and become less diffused. By this means the degree of closure of the magnetic circuit of the core is increased and the reaction in coils P' increased. This variation of partial magnetic closure or variation of magnetic resistance obviously takes place independently of the magnetic circuit formed by the core threading the coils S.

Leaving out of consideration the coil S' in the circuit of S, the operation in regulating or adjusting the current in the circuit of secondary S is as follows: When there is a tendency to increase of current in the circuit of S, due to decrease of resistance, there is an attendant decrease in the counter electro-motive force of the primary coil P, as is well understood, and there would hence be a tendency to increase of flow in the coil P; but with an increase of flow in the coils of P there is also an increase in the coils of P', and an increase in the number of lines of magnetism which pass over the magnetic resistance at K is produced. Inasmuch as the reaction of the coil P' depends upon the amount of magnetic disturbance set up in its core or the number of lines passing from $e$ to $e'$, it is obvious that the currents flowing from $a$ to $b$ will meet an increased self-inductive reaction, and the current on the secondary circuit S will be cut down.

As the rate of variation of closure at K may be varied by any desired means, and may, in fact, be determined by the width of the space K, as well as by the means to be described, it is obvious that the regulation or the adjustment of current in the circuit of S may be of any desired nature. The prime object of my invention is, however, to secure a practically constant current in said circuit, and the width of the gap K is made such as to produce as near as may be that effect. The regulation of the current or potential in the secondary circuit might also be produced by variably closing a magnetic circuit developed by the secondary current and independently of the magnetic circuit of the primary current. Thus, as indicated at S', the secondary current may pass through a coil which shall set up magnetic effects in a core having a partial magnetic closure of variable amount, as at K. In this case the same effect of a reduction in the current or potential of the secondary is produced by the variation in inductive reaction at the coil S', secured by variably closing the magnetic circuit of the core of S' at K.

The effects produced by the variation of magnetic closure of the core excited by the secondary current might obviously be used alone or in conjunction with similar effects produced in the primary, as at P.

Instead of varying the magnetic closure of a core surrounded by a separate coil, I may, as shown in Fig. 1 and other figures, variably close the magnetic circuit for the portions of core of the coils P S themselves, each portion of core having its magnetism closed without passing through the other portion. This is accomplished by means of projections $e\ e'$, extending from some part of the iron core or circuit which threads both the primary and secondary coils, said projections being separated from one another by a space, K, forming a magnetic resistance similar to the space K of Fig. 17. By means of the variable magnetic resistance formed at K the magnetism developed in the portion of core surrounded by the coil P is variably closed. In fact, such magnetism can work, as it were, through two magnetic circuits, one including the space or resistance K and the other including the portion of core passing through the coil S. The magnetic lines developed by the core or coil P, which pass through the air-space at K and escape the coil S, produce wholly self-inductive effects, resulting in an opposition to the flow of the primary currents, while all the lines developed by the coil P, which pass through the axis of the coil S, result, as usual, in the production of secondary currents.

It will be readily seen that, as before described, any tendency to increase of the current flowing in coil P, resulting from a lowering of the resistance in the circuit of S, will be at once followed by the development of increased magnetization of the portion of core in coil P by the formation of increased magnetic lines across the air-space, while at the same time the self-induction of the coil S itself will undergo an increase, owing to the fact that a path of variable closure for the magnetism in said core is likewise formed across the space K. In fact, the effect of a slight increase of current in the coil S would be to beat back the lines of force tending to pass through its coils from the coil P and cause them to be shunted across the space K. The result of all this is that the varying resistance in the circuit of the secondary S would receive a current which tends to be limited in strength and to be self-regulated through the provision of the variable magnetic resistance formed at the point K' on partial closure of the magnetic circuit for the cores of the coils. As will be observed, the effects and principle of operation are much the same as before explained in connection with Fig. 17, excepting that the partially-closed path here permits the added effect due to the beating back of the inducing magnetism in S, and in effect results in a shunting from S of the magnetism developed by coil P.

In Figs. 1 and 2, A represents an arc lamp, or a series of arc lamps, fed with constant current from the secondary P, although the primary coil S is subject to constant potentials. The coils organized as shown in Fig. 1, if the distance between the projections $e$ be properly determined, will have the peculiar property of producing in the secondary coil S a droop or fall of electro-motive force when the resistance is cut out of the circuit, and this fall may be made nearly proportionate to the fall of the resistance, or diminishing resistance, in such circuit. The space K might be filled, in whole or in part, with solid or liquid substance—such as wood, paper, slate, &c.

The partial closure of the magnetic circuit of the core I may be produced outside of both coils P S, instead of between them, as indicated in Fig. 3, or a partial magnetic closure may be provided at two points, K K, as indicated in Fig. 4. In the case of the arrangement shown in Fig. 3 the coils P and S might be interchanged in position on the core I I. The core I might also take the form indicated in Fig. 5 without changing the essential character of the action.

The degree of magnetic closure at K might be also primarily determined by moving the projections $e\ e'$ toward one another, as by a screw, W, (shown in Fig. 6,) such screw being operated by hand, or by applied means, in accordance with the effects desired in the secondary circuit. The nearer the projections $e\ e'$ are brought together the smaller will be the current given out in the secondary S, and vice versa. The distance between the projections affects but little the potential of coil S on open circuit; but when the coil is put to work its possible current becomes limited in accordance with the distance between $e\ e'$.

Instead of operating the screw W to regulate the current in the secondary coil in accordance with changes of resistance in the same, said screw may be employed simply to set the projections $e\ e'$ in definite relation to each other, leaving the operations of the closure of the magnetic circuit at its resisting portion K to be effected in the manner already described by the bunching or increasing of the number of lines of magnetic force passing across the space when the current increases in the coil P or in S.

The operation of closure of the magnetic circuit of the core may be effected by still other means—as, for instance, by varying the insertion of a conductor, such as a copper plate, K', Fig. 7, in the magnetic field or lines of magnetic force through which the magnetism of the core is closed upon itself. The conductor K', Fig. 7, when fully inserted in the air-space between e e', cuts off still further the passage of magnetism across from one projection to the other through the setting up by induction in said conductor of strong currents of high self-induction which oppose the magnetic effects. The action is virtually to increase the magnetic resistance at this point. By drawing out the conducting-plate the amount of the current-induction in the space is lessened and the closure of the magnetic circuit of the core is improved, with the effect of heightening the self-inductive or reactive effects in the circuit of the current which excites the core.

To make the action of the conductor K' automatic, it may be hung on a movable support—such as a lever, L—and be permitted to come part way between the projections e e', as shown. When the current is flowing in the coils P, the plate will tend to be repelled from the space. The spring Z may be employed to partially counterbalance the weight of the piece K'. This device will still further perfect the automatic action of the apparatus in delivering a constant current to the coil S.

In Fig. 9 the conductor K' is shown as a hollow frame, of copper or other good conductor, partially counterbalanced by a weight, Z. This device being set so that when current is passing in the coil P it will be balanced in a position partly within the space K, as in Fig. 8, the secondary coil S being at the same time in circuit with its normal resistance, an action as follows will be produced: If the resistance be partly cut off, there will generally be a slight increase of current in the coil. The frame K' is thereby repelled outward from the slot and will compensate for such increase, since a movement of K' outward will result in a diminished current in the coil S under any conditions. The apparatus by suitable balancing can thus be made accurately self-adjustable, so that a constant strength of current or an average constant strength is produced in the coil S, unless the resistance interposed exceeds its proper limits. Where the current to be obtained is to have properties between those due to constant-potential average and constant-current average, the modification Fig. 10 may be adopted. One coil, S', or part of the secondary winding, is near the coil P, or adjacent thereto, (or under or overlying the same,) and the other part of the secondary is at S removed therefrom on the same core. In this case the terminals of the secondary coils in series will not either deliver constant potentials or constant current; but if the resistance in the secondary be diminished the current will increase, but at a less rate than constant potential would give, so that a limited current of moderate strength flows even on short circuit.

Fig. 11 shows a form of induction-coil by which an action similar to that of Fig. 1 may be produced. Between each primary coil and secondary the iron of the core is extended inward to approach similar projections upon other points of the core. The projections at their ends are separated by small spaces similar to the spaces K, and over such space the variable closure of the magnetic lines from the portions of core including the coils P and S is formed.

In Fig. 12 the core itself is made as an interior ring bound with coils P S, and has an exterior ring closely enveloping it, which outer ring may be joined to the inner one between the alternate coils, as shown. The variable closure of the magnetic circuit occurs at the points e e'.

Fig. 13 shows a form of core differing from that of Fig. 1 only in outline. To construct this form the core may be formed in two parts joined on the dividing-line X X.

Instead of employing the device shown in Fig. 6 for varying the magnetic closure, I may use an arrangement such as shown in Fig. 20, where the one part, e, slides to and from the other part in suitable guides formed in the magnetic core I. This movement may be used to primarily regulate the flow of current in the secondary S in obedience to changes in resistance, or the part may be set or adjusted and left in position, the variable closure being then dependent solely upon the number of lines of force which are concentrated across the space between the projections e e'.

Fig. 14 illustrates the application of my invention to the running of a series of incandescent lights or other working-resistance from the secondary coil S, the coil P being connected with the constant-potential alternating mains A B. When the adjustments are properly made, one or even all the lights L L may be shunted by switches of no resistance, and the current in the circuit of S will be substantially unchanged in amount—i. e., the potential of the coil S is self-adjusting to the resistance in the circuit unless the latter be too great.

Fig. 15 shows how a wire, L, may be maintained at a uniform temperature while its length in circuit may be greatly varied, owing to constant-current strength obtained, notwithstanding constant potentials at a b. For arc-light work or for electric furnaces or heating, as in Fig. 16, my invention permits distribution at constant potential to the coils and feeding to the work, as at A, currents of constant volume, or, as before indicated, of a volume much less increasing than in the ratio of constant potential over the resistance in circuit.

It is not to be understood that with all the arrangements described there is an absolute adjustment of the potential on the secondary, so that an absolutely constant current is obtained despite variations of resistance, and Fig. 17 is intended only to illustrate the principle of my invention in so far as it shows how a diminution of potential may be obtained automatically with a diminution in the resistance. In that figure, as in the arrangement shown in Fig. 10, the current will increase, but at a less rate than constant potential would give; but there would be an adjustment which would prevent an abnormal rise of current in the secondary. The introduction of either coil S or S' will, in Fig. 17, cause a rapid fall of potential with a variable resistance at A when the resistance diminishes, while at the same time the lines $a\ b$ may be of constant differences of potential.

Fig. 18 illustrates a modified arrangement, resembling in some respects Fig. 10, and in others Fig. 17. An ordinary induction-coil P S, with closed magnetic core, has each of its circuits, including a coil, P' or S', placed on a core and combined after the manner of the coils P S, Fig. 1. By the variation of magnetic closure of the cores or portions of core or coils P' S' at K an adjustment of current on the secondary circuit of S S' of any desired character, according to the character of adjustment, may be obtained.

Fig. 19 shows the curve, which may be called the "characteristic curve," of the secondary currents in such a coil as Fig. 1, &c., the verticals or ordinates representing the electro-motive forces evolved, and the horizontals or abscissas the current strengths corresponding thereto. At electro-motive forces below one hundred, as marked, the curve is almost a vertical line, showing that a constant current is evolved at any resistance below that corresponding to a potential of one hundred. The dotted curve represents the case of drooping or falling potential with increase of current, such as is obtained with the special devices shown in Figs. 10, 17, and 18.

What I claim as my invention is—

1. The herein-described method of adjusting, regulating, or determining the current or potential in the secondary of two coils or circuits placed in inductive relation, consisting in developing alternating magnetism through the action of the current in each or either of said circuits in a suitable iron core and variably closing the magnetic circuit of said core through a path independent, in whole or in part, of the core or portion of core in which magnetism is developed by the other coil or circuit.

2. The herein-described method of obtaining a fall of potential in the secondary circuit of an induction-coil fed from a constant-potential source, consisting in magnetizing a core by one of said circuits and partially closing the magnetic circuit of said core through a path of determinate or set value independent of the core or portion of core which is excited by the other circuit.

3. The herein-described method of regulating the current in the secondary circuit of a transformer, which consists in developing a magnetism by current in each or either circuit of the transformer and variably closing the magnetic circuit through a path independent of the core or portion of core carrying the coil or the other circuit of the transformer.

4. The herein-described method of obtaining a substantially-constant current in the variable-resistance circuit of a transformer fed from a constant-potential source, consisting in shunting the magnetism threading the two coils of the transformer in variable amount, as and for the purpose described.

5. The herein-described method of obtaining a constant current in a variable-resistance circuit from a constant-potential source, consisting in passing the current from said source through the primary of an induction-coil whose secondary is connected to the variable-resistance circuit, setting up rapid alternations of magnetism in a suitable core by current in each or either of said circuits, and causing a variable closure of the magnetic circuit for said core through a partial magnetic circuit which is independent of the core for the other.

6. The herein-described method of regulating the current in the secondary circuit of an alternating transformer, consisting in setting up alternations of magnetism by the current in each or either of the coils of said transformer, partially closing the magnetic circuit, and adjusting a conducting plate or body transversely in a gap of such circuit to vary the closure.

7. The herein-described method of regulating the current in the secondary of an induction-coil, consisting in disposing the primary or secondary on different parts of an endless iron core and magnetically shunting the magnetism of the iron core in increased amount with an increase of current in the secondary.

Signed at Lynn, in the county of Essex and State of Massachusetts, this 31st day of December, A. D. 1888.

ELIHU THOMSON.

Witnesses:
J. W. GIBBONEY,
E. W. RICE, Jr.